United States Patent Office 2,863,865
Patented Dec. 9, 1958

2,863,865

ORGANIC COMPOUNDS

Brooke D. Aspergren, Kalamazoo, and Richard V. Heinzelman, Kalamazoo Township, Kalamazoo County, Mich., assignors to The Upjohn Company, Kalamazoo, Mich., a corporation of Michigan No Drawing. Application November 2, 1956
Serial No. 619,927

3 Claims. (Cl. 260—243)

This invention relates to new organic compounds and is particularly directed to 10-(2-pyrrolidinoethyl)-phenothiazine sulfoxide and homologues thereof either as the free base, as an acid addition salt, or as a quaternary ammonium salt.

It is an object of the invention to provide novel physiologically active compounds. It is a further object to provide novel drug potentiators, antihistaminics, tranquilizers, and diuretics. It is a further object to provide novel compounds which are safe and effective for these purposes and have higher therapeutic indexes than the corresponding sulfides.

These and other objects are accomplished in the novel compounds of the invention which for the most part are represented by the following basic formula:

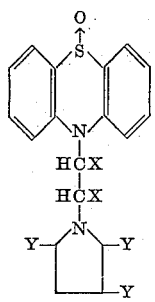

wherein X is a radical of the group consisting of hydrogen and lower alkyl radicals and Y is a radical of the group consisting of hydrogen and methyl radicals. The compounds represented by this formula can exist and can be used for the purposes of the invention in the form of the free base, an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, ascorbic, tartaric, maleic, malic, lactic acids, and the like, or as a quaternary ammonium salt thereof such as the methobromide, ethochloride, ethyl paratoluenesulfonate, benzyl chloride and like quaternary ammonium salts obtained from alkyl and aralkyl halides and alkyl sulfonates.

The novel compounds of this invention are derivatives of the 10-(pyrrolidinoalkyl)-phenothiazines of U. S. Patents 2,483,998 and 2,483,999 and are prepared by reacting the hydrochloride or like acid addition salt, or the methobromide or like quaternary ammonium salt, with a peroxidizing agent, such as hydrogen peroxide, peracetic acid, perbenzoic acid, and persulfuric acid. The reaction advantageously is carried out in a solvent, aqueous ethanol, aqueous methanol, aqueous isopropanol, water, and acetic acid being suitable, and proceeds with satisfactory velocity at room temperature. Higher or lower temperatures, for example, from zero to 100 degrees centigrade, can be used, however.

The compounds of this invention can also be prepared by substituting phenothiazine sulfoxide for phenothiazine in the processes of the above patents. The sulfoxides of free bases, acid addition salts, and quaternary ammonium salts disclosed in the above patents are thereby obtained directly.

The compounds of the invention possess diuretic activity and have the advantage of causing increased urine excretion without any essential change in the electrolyte composition of the urine. The parent compounds, i. e., the corresponding sulfides, on the other hand, have little if any diuretic activity. The relative efficiency of the compounds of the invention and the corresponding sulfides is shown in the following comparative tests. 10-(2-pyrrolidinoethyl)-phenothiazine sulfoxide hydrochloride and the corresponding sulfide, 10-(2-pyrrolidinoethyl)-phenothiazine hydrochloride were administered orally to rats in dosages of 5 and 10 mg./kg. The resultant diuresis, expressed as percentage increase in urine excretion over that of control rats, is shown in the following table:

| Compound | Dosage, mg./Kg. | |
|---|---|---|
|  | 5 | 10 |
| 10-(2-pyrrolidinoethyl)-phenothiazine·HCl | 9 | 5 |
| 10-(2-pyrrolidinoethyl)-phenothiazine sulfoxide·HCl | 54 | 67 |

The above data demonstrate that the sulfoxide is outstandingly more effective as a diuretic agent than the parent compound. Since both compounds have the same order of toxicity, the therapeutic index of the sulfoxide is much superior to that of the parent compound.

The following examples will serve to explain the procedure of this invention. However, they are set forth merely as illustrations, and it is to be understood that the invention is not to be limited by their scope.

EXAMPLE 1

*10-(2-pyrrolidinoethyl)-phenothiazine sulfoxide hydrochloride*

In a twelve-liter, three-neck flask equipped with stirrer and reflux condenser a mixture of 1200 grams (3.6 moles) of 10-(2-pyrrolidinoethyl)-phenothiazine hydrochloride, four liters of denatured alcohol (90 percent ethanol, 5 percent methanol, and 5 percent water), and 430 grams (3.78 moles) of 30 percent hydrogen peroxide were allowed to stand at room temperature without stirring for 72 hours. The dark red solution was stirred and heated under reflux on the steam bath for two hours. About one gram of 30 percent platinum-on-charcoal in aqueous suspension was added and the solution was stirred at room temperature for two hours. After filtering with vacuum through a filter aid, the solvent was distilled under reduced pressure from a steam bath with stirring. About 500 milliliters of benzene were added to the residual red oil and distilled with stirring under reduced pressure to remove the last traces of water. Addition with stirring of two liters of ethyl acetate caused crystallization to occur. The filtered product was redissolved in a mixture of four liters of ethyl acetate, 1500 milliliters of absolute ethanol, and 800 milliliters of methanol and stirred at the boil with 20 grams of decolorizing charcoal for ten minutes. After filtering through a filter aid the solution was concentrated to one-half the original volume and cooled. The crystalline product, 10-(2-pyrrolidinoethyl)-phenothiazine sulfoxide hydrochloride, was filtered, washed with one liter of dry ether, and dried in a vacuum oven at fifty degrees centigrade, after which it weighed 1035 grams (83 percent yield) and had a melting point of 219–220 degrees centigrade.

*Analysis.*—Calcd. for $C_{18}H_{21}ClN_2OS$: C, 61.96; H, 6.07; Cl, 10.16; N, 8.03; S, 9.19. Found: C, 62.29; H, 6.04; Cl, 10.14; N, 7.96; S, 9.26.

The infrared absorption spectrum, which was different from that of the starting material, was in agreement with the expected sulfoxide structure.

The free base is obtained by reacting the hydrochloride with alkali such as sodium hydroxide and extracting the free base with ether. The free base can then be converted to other salts such as the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like by neutralization with the appropriate acid.

By reacting the free base, advantageously in solution in methyl ethyl ketone, with methyl bromide, there is obtained 10-(2-pyrrolidinoethyl)-phenothiazine sulfoxide methobromide. By substituting ethyl chloride, benzyl chloride, ethyl paratoluenesulfonate and like alkyl and aralkyl esters, there are obtained the corresponding ethochloride, benzyl chloride, ethyl paratoluenesulfonate, and like alkyl and aralkyl quaternary ammonium salts.

By substituting in Example 1 the hydrochlorides of the various 10-(pyrrolidylalkyl)-phenothiazines disclosed in U. S. Patents 2,483,998 and 2,483,999, there are obtained the corresponding sulfoxides, first as the hydrochloride according to the procedure of Example 1 and then as the free base or other acid addition salt. The following examples are illustrative.

EXAMPLE 2

*10-[2-(2,4-dimethylpyrrolidino)propyl]-phenothiazine sulfoxide hydrochloride*

By substituting 10-[2-(2,4-dimethylpyrrolidino)propyl]-phenothiazine hydrochloride for 10-(2-pyrrolidinoethyl)-phenothiazine hydrochloride in Example 1, there is obtained 10 - [2 - (2,4 - dimethylpyrrolidino)propyl]-phenothiazine sulfoxide hydrochloride.

On reaction with alkali and extraction with ether, the free base is obtained. On neutralization of the free base with the appropriate acid, the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like are obtained.

By reacting the free base, advantageously in solution in methyl ethyl ketone, with methyl bromide, there is obtained 10-[2-(2,4-dimethylpyrrolidino)propyl]-phenothiazine sulfoxide methobromide. By substituting ethyl chloride, benzyl chloride, ethyl paratoluenesulfonate and like alkyl and aralkyl esters there are obtained the corresponding ethochloride, benzyl chloride, ethyl paratoluenesulfonate, and like alkyl and aralkyl quaternary ammonium salts.

EXAMPLE 3

*10-[2-(2,4-dimethylpyrrolidino)ethyl]-phenothiazine sulfoxide hydrochloride*

By substituting 10-[2-(2,4-dimethylpyrrolidino)ethyl]-phenothiazine hydrochloride for 10-(2-pyrrolidinoethyl)-phenothiazine hydrochloride in Example 1, there is obtained 10-[2-(2,4-dimethylpyrrolidino)ethyl]-phenothiazine sulfoxide hydrochloride.

On reaction with alkali and extraction with ether, the free base is obtained. On neutralization of the free base with the appropriate acid, the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like are obtained.

By reacting the free base, advantageously in solution in methyl ethyl ketone, with methyl bromide, there is obtained 10-[2-(2,4-dimethylpyrrolidino)ethyl]-phenothiazine sulfoxide methobromide. By substituting ethyl chloride, benzyl chloride, ethyl paratoluenesulfonate and like alkyl and aralkyl esters there are obtained the corresponding ethochloride, benzyl chloride, ethyl paratoluenesulfonate, the like alkyl and aralkyl quaternary ammonium salts.

EXAMPLE 4

*10-[2-(2,5-dimethylpyrrolidino)ethyl]-phenothiazine sulfoxide hydrochloride*

By substituting 10-[2-(2,5-dimethylpyrrolidino)ethyl]-phenothiazine hydrochloride for 10-(2-pyrrolidinoethyl)-phenothiazine hydrochloride in Example 1, there is obtained 10-[2-(2,5-dimethylpyrrolidino)ethyl]-phenothiazine sulfoxide hydrochloride.

On reaction with alkali and extraction with ether, the free base is obtained. On neutralization of the free base with the appropriate acid, the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like are obtained.

By reacting the free base, advantageously in solution in methyl ethyl ketone, with methyl bromide, there is obtained 10-[2-(2,5-dimethylpyrrolidino)ethyl] - phenothiazine sulfoxide methobromide. By substituting ethyl chloride, benzyl chloride, ethyl paratoluenesulfonate, and like alkyl and aralkyl esters there are obtained the corresponding ethochloride, benzyl chloride, ethyl paratoluenesulfonate, and like alkyl and aralkyl quaternary ammonium salts.

EXAMPLE 5

*10-(2-pyrrolidinopropyl)-phenothiazine sulfoxide hydrochloride*

By substituting 10-(2-pyrrolidinopropyl)-phenothiazine hydrochloride for 10-(2-pyrrolidinoethyl)-phenothiazine hydrochloride in Example 1, there is obtained 10-(2-pyrrolidinopropyl)-phenothiazine sulfoxide hydrochloride.

On reaction with alkali and extraction with ether, the free base is obtained. On neutralization of the free base with the appropriate acid, the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like are obtained.

By reacting the free base, advantageously in solution in methyl ethyl ketone, with methyl bromide, there is obtained 10-(2-pyrrolidinopropyl)-phenothiazine sulfoxide methobromide. By substituting ethyl chloride, benzyl chloride, ethyl paratoluenesulfonate and like alkyl and aralkyl esters there are obtained the corresponding ethochloride, benzyl chloride, ethyl paratoluenesulfonate, and like alkyl and aralkyl quaternary ammonium salts.

EXAMPLE 6

*10-[2-(2,5-dimethylpyrrolidino)propyl]-phenothiazine sulfoxide hydrochloride*

By substituting 10-[2-(2,5-dimethylpyrrolidino)propyl]-phenothiazine hydrochloride for 10-(2-pyrrolidinoethyl)-phenothiazine hydrochloride in Example 1, there is obtained 10-[2-(2,5-dimethylpyrrolidino)propyl]-phenothiazine sulfoxide hydrochloride.

On reaction with alkali and extraction with ether, the free base is obtained. On neutralization of the free base with the appropriate acid, the hydrobromide, the hydroiodide, the sulfate, the phosphate, the nitrate, the acetate, the benzoate, the salicylate, the glycolate, the succinate, the nicotinate, the ascorbate, the tartrate, the maleate, the malate, the lactate, and the like are obtained.

By reacting the free base, advantageously in solution in methyl ethyl ketone, with methyl bromide, there is obtained 10-[2-(2,5-dimethylpyrrolidino)propyl]-phenothiazine sulfoxide methobromide. By substituting ethyl chloride, benzyl chloride, ethyl paratoluenesulfonate and like alkyl and aralkyl esters there are obtained the corresponding ethochloride, benzyl chloride, ethyl paratoluenesulfonate, and like alkyl and aralkyl quaternary ammonium salts.

The novel compounds of this invention can be used for the same purposes and in the same dosage forms, such as tablets, injectables, and elixirs, as 10-(2-pyrrolidinoethyl)-phenothiazine and the salts thereof.

This application is a continuation-in-part of application Serial No. 581,300, filed April 30, 1956, and now abandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The sulfoxide of a 10-(2-pyrrolidinoalkyl)phenothiazine derivative selected from the group consisting of (a) compounds having the following general structural formula:

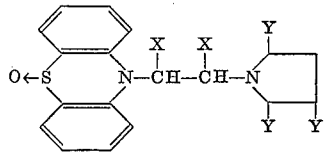

wherein X is selected from the group consisting of hydrogen and lower alkyl and Y is selected from the group consisting of hydrogen and methyl and (b) pharmacologically acceptable acid addition, and alkyl and aralkyl quaternary ammonium salts thereof.

2. 10-(2-pyrrolidinoethyl)phenothiazine sulfoxide.

3. 10-(2-pyrrolidinoethyl)phenothiazine sulfoxide hydrochloride.

References Cited in the file of this patent

UNITED STATES PATENTS

| | | |
|---|---|---|
| 2,483,998 | Hunter et al. | Oct. 4, 1949 |
| 2,483,999 | Hunter et al. | Oct. 4, 1949 |
| 2,590,125 | Robinson et al. | Mar. 25, 1952 |
| 2,629,719 | Cusic | Feb. 24, 1953 |
| 2,687,414 | Cusic | Aug. 24, 1954 |